No. 747,750. PATENTED DEC. 22, 1903.
W. W. MURCH.
RATCHET WRENCH.
APPLICATION FILED MAY 14, 1903.
NO MODEL.

WITNESSES
INVENTOR
William W. Murch
BY
ATTORNEYS.

No. 747,750. Patented December 22, 1903.

UNITED STATES PATENT OFFICE.

WILLIAM WARNER MURCH, OF NEW YORK, N. Y., ASSIGNOR OF ONE-HALF TO SAMUEL S. HOLDEN, OF NEW YORK, N. Y.

RATCHET-WRENCH.

SPECIFICATION forming part of Letters Patent No. 747,750, dated December 22, 1903.

Application filed May 14, 1903. Serial No. 157,119. (No model.)

*To all whom it may concern:*

Be it known that I, WILLIAM WARNER MURCH, a citizen of the United States, and a resident of the city of New York, borough of Brooklyn, in the county of Kings and State of New York, have invented a new and Improved Ratchet-Wrench, of which the following is a full, clear, and exact description.

The object of the invention is to provide a new and improved ratchet-wrench which is simple and durable in construction and arranged to permit the user to quickly and conveniently screw up or unscrew nuts, bolts, and the like without disengaging the nut or bolt-head during either of the operations.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
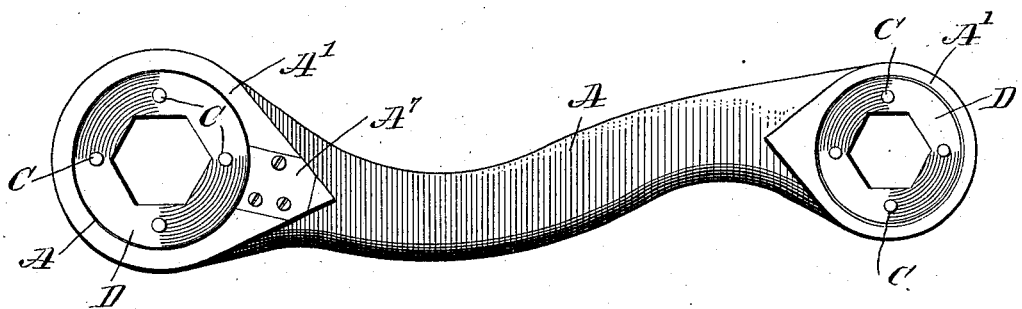
Figure 1:
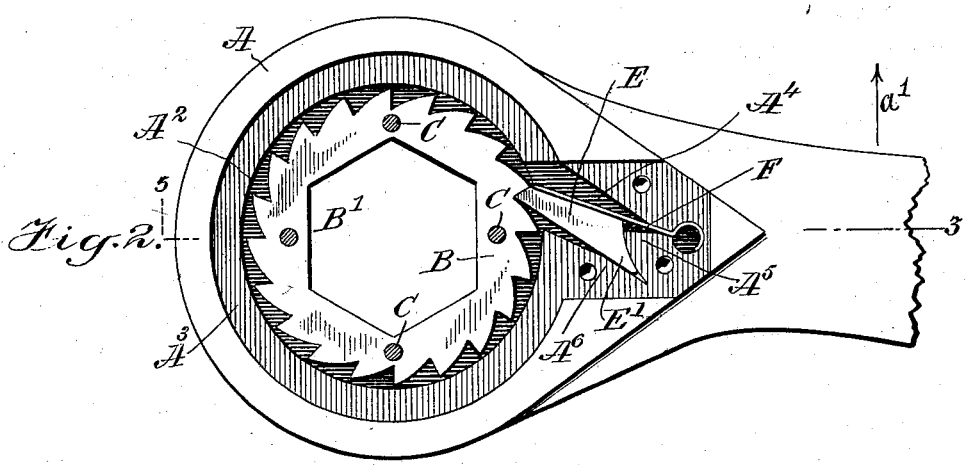
Figure 1:
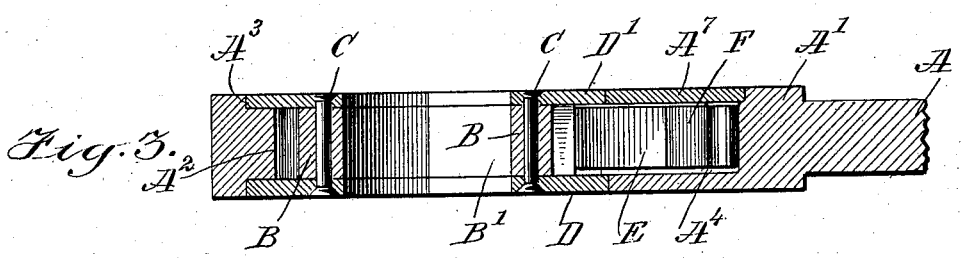

Figure 1 is a plan view of the improvement. Fig. 2 is an enlarged plan view of the same, showing one of the flanges of the head and the cover-plate removed; and Fig. 3 is a transverse section of the same on the line 3 3 of Fig. 2.

The handle A of the wrench is provided at either or both ends $A'$ with a transverse aperture $A^2$, in which extends a ratchet-wheel B, on the faces of which are fastened, by rivets, bolts, or other fastening devices C, flanges D D', somewhat larger in diameter than the ratchet-wheel B and fitting into bearings formed on the faces of the corresponding end $A'$, as plainly indicated in Fig. 3, the said ratchet-wheel B and the flanges D D' being provided with a polygonal opening B' for engaging the nut, bolt-head, or like device to be turned by the wrench.

The ratchet-wheel B and the flanges D D', attached thereto, form the wrench-head, mounted to turn in the end $A'$ of the handle A without the teeth of the ratchet-wheel B touching the wall of the aperture $A^2$. The outer faces of the flanges D D' are preferably flush with the corresponding faces of the end $A'$, so that the ratchet-head does not project from the faces of the handle, and consequently forms no obstruction whatever.

The ratchet-wheel B is engaged by the free end of a pawl E, extending in a recess $A^4$, formed in the end $A'$, and the heel $E'$ of the said pawl is mounted to swing between shoulders $A^5 A^6$, integral with the end $A'$ and arranged in such a manner that the heel $E'$, with the pawl, can readily swing sufficiently to glide with its free end over the teeth of the ratchet-wheel B. A spring F, secured with one end in the end $A'$, presses the pawl E, so as to hold the free end thereof in engagement with the teeth of the ratchet-wheel B. Now it will be seen that when the opening B' is engaged with the nut, bolt-head, or like device to be turned and the handle A is swung in the direction of the arrow $a'$, then the pawl E prevents the ratchet-wheel B, and consequently the ratchet-head, from turning, so that the ratchet-head swings with the end $A'$ to turn the nut or bolt-head in one direction. On swinging the handle A in the inverse direction of the arrow $a'$ the ratchet-head remains at a standstill, while the pawl E glides over the teeth of the ratchet-wheel B, and then when the handle A is again swung in the direction of the arrow $a'$ the ratchet-head is turned, and with it the nut or bolt-head, as previously explained. When it is desired to turn the nut or bolt-head in an opposite direction, then the ratchet-head is disengaged and turned over, to be finally reëngaged by the opening B', and then the above-described operation is repeated, with the difference that on swinging the handle A forward and backward the nut or bolt-head is turned in the opposite direction.

From the foregoing it will be seen that the strain on the ratchet-head is taken up by the pawl E and transmitted to the shoulders $A^5$ and $A^6$, and consequently directly to the handle A, and hence there is very little danger of breaking the pawl E or its spring F, which latter simply serves to hold the pawl in engagement with the ratchet-wheel.

The recess $A^4$, the pawl E, and the spring F are covered up by a suitable covering-plate $A^7$, fastened by screws or the like to the end $A'$, as plainly indicated in the drawings, so that the said parts are not exposed to view, and dust and the like is not liable to interfere with the proper working of the pawl.

By having the flanges D and D' arranged as described the ratchet-wheel is kept free from dust and other impurities, and hence a proper working of the wrench is at all times insured.

The wrench will prove very serviceable in places in which but a limited swinging motion can be given to the handle A, it being understood that it is only necessary for the operator to swing the handle A forward and backward to turn the nut, bolt-head, or like device to screw the same up to the desired place or to unscrew the same, as the case may be, in either operation, however, it not being necessary to remove the ratchet-head from the nut, bolt-head, or like device.

Having thus described my invention, I claim as new and desire to secure by Letters Patent—

1. A ratchet-wrench having a handle formed at the end with a transverse aperture, a ratchet-head mounted to turn in said aperture and consisting of a ratchet-wheel, disk flanges secured to the faces of the ratchet-wheel and engaging bearings in the faces of the handle, the outer surfaces of the flanges being flush with the faces of the handle, the said ratchet-wheel and flanges having a polygonal opening for engaging the nut, bolt or like device to be turned, said handle having a recess on one side extending tangentially from the opening in which the ratchet is located, said recess terminating in forked angular-like ends with their inner walls curved gently toward each other, a pawl in said recess having its front end in engagement with the ratchet-wheel and its rear end extending into one of the forks in said recess, said rear end of the pawl being formed of an angle slightly sharper than the angle of the fork into which it is received and rounded on its side next the curved wall of its fork, whereby to adapt the free end of said ratchet to yield laterally to permit it to pass backwardly over the teeth of the ratchet-wheel, and a spring extending from the extreme point of the other fork of said recess and pressing upon the back of said pawl to hold it in engagement with said ratchet-wheel, as set forth.

2. A ratchet-wrench having a handle formed at the end with a transverse aperture, a ratchet-head mounted and suitably held to turn in said aperture, said handle having a recess on one side extending from the opening in which the ratchet is located, said recess terminating in an angular-like end with its upper wall slightly curved; a pawl in said recess having its forward end in engagement with the ratchet-wheel and its rear end extending into the angular end of said slot, said rear end of the pawl being formed of an angle slightly sharper than the angle of the recess into which it is received and rounded on its upper side to fit said curved wall, and a spring pressing said pawl to hold the same in engagement with said ratchet-head.

In testimony whereof I have signed my name to this specification in the presence of two subscribing witnesses.

WILLIAM WARNER MURCH.

Witnesses:
EDMUND E. STANCLIFF,
LOUIS L'HOMMEDIEU.